(12) United States Patent
Tsai

(10) Patent No.: US 7,353,420 B2
(45) Date of Patent: Apr. 1, 2008

(54) CIRCUIT AND METHOD FOR GENERATING PROGRAMMABLE CLOCK SIGNALS WITH MINIMUM SKEW

(75) Inventor: Rong-Chuan Tsai, Hsinchu (TW)

(73) Assignee: Winbond Electronics Corp., Hsinchu (TW)

( * ) Notice: Subject to any disclaimer, the term of this patent is extended or adjusted under 35 U.S.C. 154(b) by 405 days.

(21) Appl. No.: 11/100,567

(22) Filed: Apr. 7, 2005

(65) Prior Publication Data
US 2006/0230302 A1    Oct. 12, 2006

(51) Int. Cl.
*G06F 1/04* (2006.01)

(52) U.S. Cl. .............. 713/503; 713/400; 713/401; 713/500; 713/502; 714/700; 377/78

(58) Field of Classification Search ........... 713/503
See application file for complete search history.

(56) References Cited

U.S. PATENT DOCUMENTS

| | | | |
|---|---|---|---|
| 5,414,381 A * | 5/1995 | Nelson et al. ............. 327/262 |
| 6,072,347 A * | 6/2000 | Sim ........................... 327/276 |
| 6,081,148 A * | 6/2000 | Song .......................... 327/292 |
| 6,101,197 A * | 8/2000 | Keeth et al. ................ 370/517 |
| 6,181,174 B1 * | 1/2001 | Fujieda et al. ............. 327/158 |
| 6,192,092 B1 * | 2/2001 | Dizon et al. ................ 375/371 |
| 6,320,436 B1 * | 11/2001 | Fawcett et al. ............ 327/158 |
| 6,323,714 B1 * | 11/2001 | Naffziger et al. .......... 327/295 |
| 6,507,230 B1 | 1/2003 | Milton |
| 6,861,886 B1 * | 3/2005 | Ludden et al. ............. 327/156 |
| 7,009,439 B2 * | 3/2006 | Park .......................... 327/291 |
| 2004/0246035 A1 * | 12/2004 | Karatani et al. ........... 327/165 |
| 2005/0127959 A1 * | 6/2005 | Leifso et al. ............... 327/117 |
| 2005/0144497 A1 * | 6/2005 | Song et al. ................. 713/503 |

* cited by examiner

*Primary Examiner*—Nitin C. Patel
(74) *Attorney, Agent, or Firm*—Finnegan, Henderson, Farabow, Garrett & Dunner LLP (57) ABSTRACT

A programmable clock deskewer generates an output clock with minimal clock skew. This is accomplished by means of a single series path coupling the input clock to the output clock. The programmable clock deskewer includes: an output clock generator, responsive to the input clock and control information, to generate the deskewed output clock; and a controller, responsive to the input clock, to generate the control information for controlling the frequency of the deskewed output clock. The programmable clock deskewer may be used to implement a clock tree with various clock outputs for a system on chip integrated circuit.

17 Claims, 12 Drawing Sheets

CIRCUIT AND METHOD FOR GENERATING PROGRAMMABLE CLOCK SIGNALS WITH MINIMUM SKEW

COPYRIGHT AUTHORIZATION

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention is in general related to a clock deskewing, that is, de-skewing, circuit and, more particularly, to a clock deskewing circuit that has an improved clock skew as compared to conventional methods.

BACKGROUND OF THE INVENTION

Typical digital electronic systems include various different functional blocks, each potentially performing operations with different clock frequencies. To reduce the cost of providing different clock signals at the different clock frequencies and to simplify the circuit design, digital electronic systems typically use a clock generation block to generate the different clock signals. Clock skew is the time difference between active edges of the different clock signals that carry the different clock frequencies. Clock skew poses a problem because various ones of the different functional blocks and engine operations must operate synchronously.

Like a typical digital electronic system, the design of a System-On-Chip Integrated Circuit (SOCIC) requires integration of various different functional blocks into one chip. Furthermore, a SOCIC requires a clock generation block, such as a clock tree, to generate the different clock signals for each functional block in the SOCIC.

In a typical clock tree, a Programmable Clock Generation Unit (PCGU) is the basic unit used to generate each clock output signal with a specified frequency based on a single input clock. The input clock path is analogous to a "tree" trunk and the various output clock paths are analogous to "tree" branches. Each output clock path includes a PCGU. A typical PCGU has a bypass path, by which the input clock is bypassed to the output, and a divided path, by which a divided-by-N version of the input clock is generated as the output clock signal. PCGUs are typically designed with delay circuits in the bypass path in order to compensate for clock skew between the bypass path and the divided path. However, compensating for delay in the divided path is difficult because delay can vary according to different circuits, cells, processes, temperatures, and voltages.

A clock tree generation tool is typically used to generate or synthesize a clock tree at the Integrated Circuit (IC) layout stage. Such a tool can automatically adjust the delays of specified clock signal paths by insertion of delay circuits. However, the tool can only handle the automatic adjustment of delay in one signal path from clock input to clock output. Thus, the tool may minimize clock skew by comparing and automatically adjusting delay among all PCGU bypass paths or among all PCGU divided paths, but not both. Several iterations of automatic or manual adjustment of a path delay are required to minimize clock skew among other signal paths. However, the skew between the bypass and divided paths of a PCGU may not be reduced to minimum after using a clock tree generation tool.

It would therefore be desirable to reduce the clock skew of a clock generation block in a digital electronic circuit or a SOCIC.

SUMMARY OF THE INVENTION

In accordance with the invention, there is provided a programmable clock deskewer, responsive to an input clock, to generate a deskewed output clock. The programmable clock deskewer includes an output clock generator that is responsive to the input clock and externally provided control information to generate the deskewed output clock. A single series logic path couples the input clock to the deskewed output clock.

In another embodiment consistent with the invention, the output clock generator is adapted to selectably generate the deskewed output clock in an inverted mode or a non-inverted mode with respect to the input clock according to the control information, and a delay introduced by the output clock generator is independent of the mode selected.

In accordance with the invention, there is also provided a clock tree, responsive to an input clock, to generate a plurality of deskewed output clocks, the clock tree comprising a plurality of branches to generate respective output clocks, wherein the paths that couple the input clock to the output clocks through respective branches are single series logic paths.

Additional features and advantages of the invention will be set forth in part in the description which follows, and in part will be obvious from the description, or may be learned by practice of the invention. The features and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and, together with the description, serve to explain the principles of the invention.

DESCRIPTION OF THE EMBODIMENTS

Reference will now be made in detail to exemplary embodiments of the invention, which are illustrated in the accompanying drawings. Wherever possible, the same reference numbers will be used throughout the drawings to refer to the same or like parts.

Figure 1:
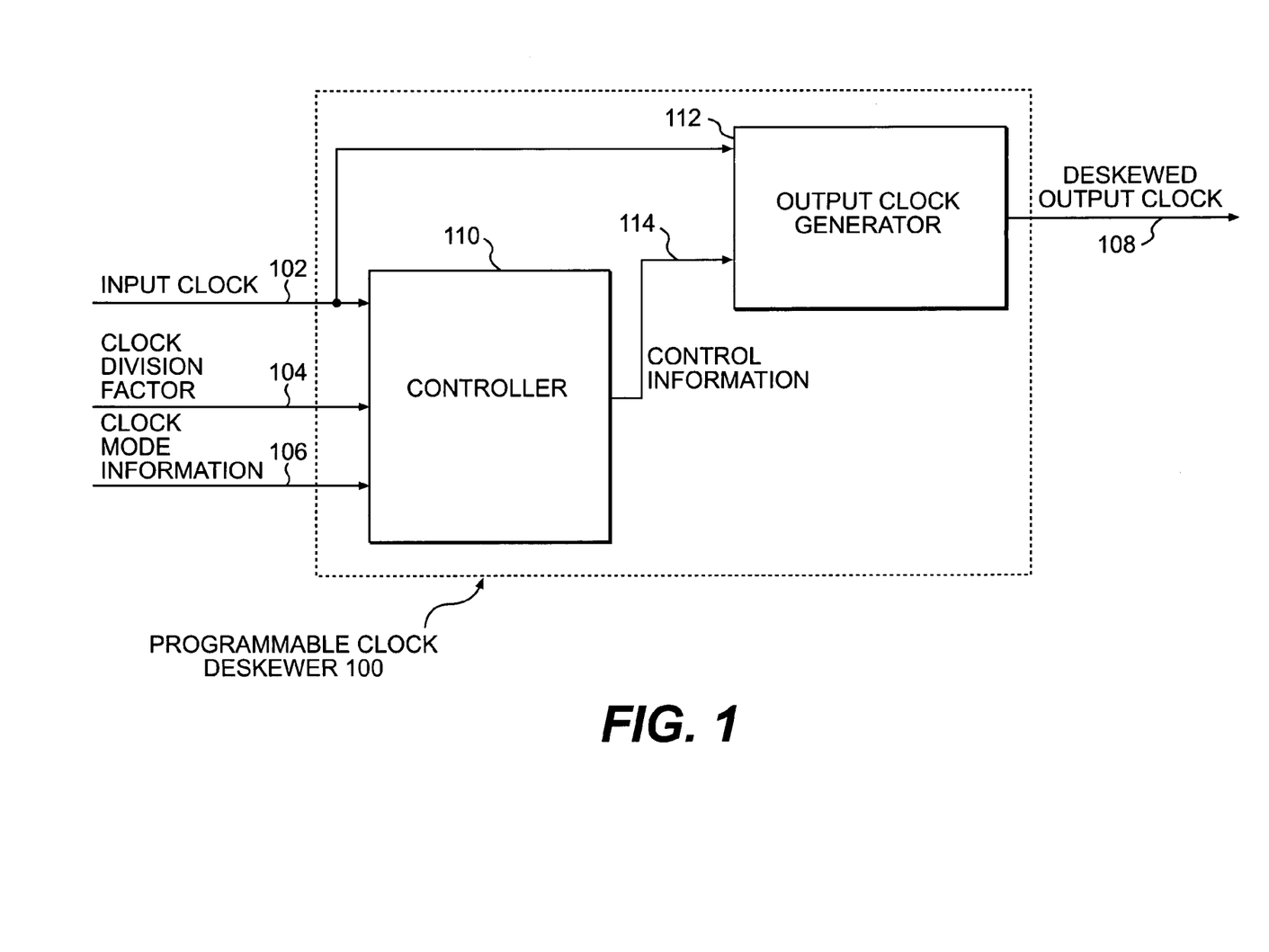
FIG. 1 is a functional block diagram of a programmable clock deskewer consistent with the present invention.

FIG. 1 depicts a programmable clock deskewer 100 consistent with the present invention. Programmable clock deskewer 100 receives an input clock 102, a clock division factor 104, and clock mode information 106 as externally provided inputs, and generates a deskewed output clock 108 that is deskewed with respect to another output clock, not shown. Clock division factor 104 may be an integer N, where N represents the number of times a frequency of the output clock divides into a frequency of the input clock. Programmable clock deskewer 100 includes a controller 110 and an output clock generator 112. Controller 110 generates control information 114 that is received as input to output clock generator 112. Output clock generator 112 also receives input clock 102 as an input and generates deskewed output clock 108.

Figure 2:
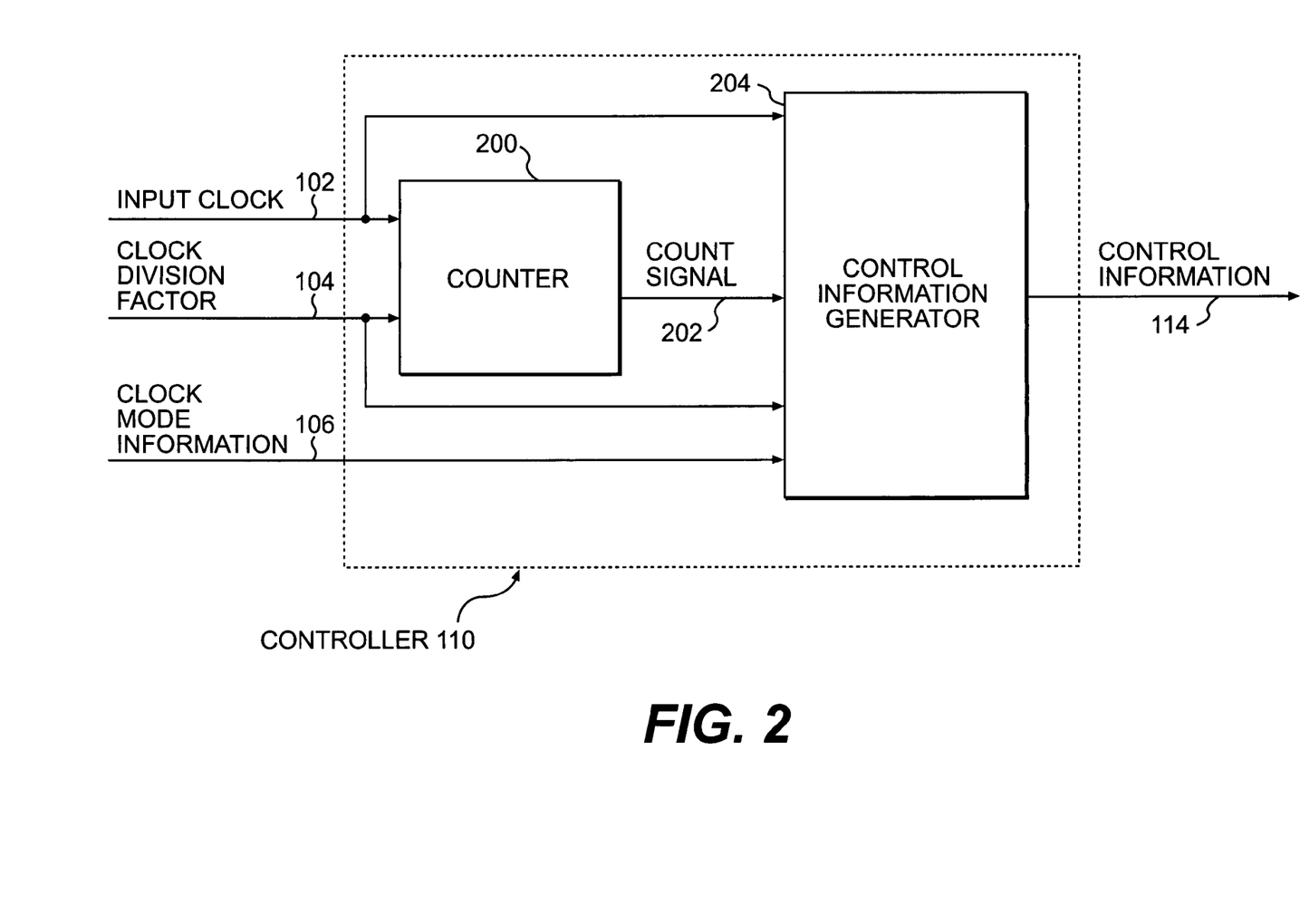
FIG. 2 is a functional block diagram of a first embodiment of a controller depicted in FIG. 1.

FIG. 2 depicts controller 110 in FIG. 1 in greater detail. Controller 110 can be implemented with a counter 200, coupled to receive input clock 102 and clock division factor 104 as inputs. Counter 200 outputs a count signal 202. A control information generator 204 is coupled to receive count signal 202, as well as input clock 102, clock division factor 104, and clock mode information 106, and generates control information 114 for controlling output clock generator 112.

Figure 3:
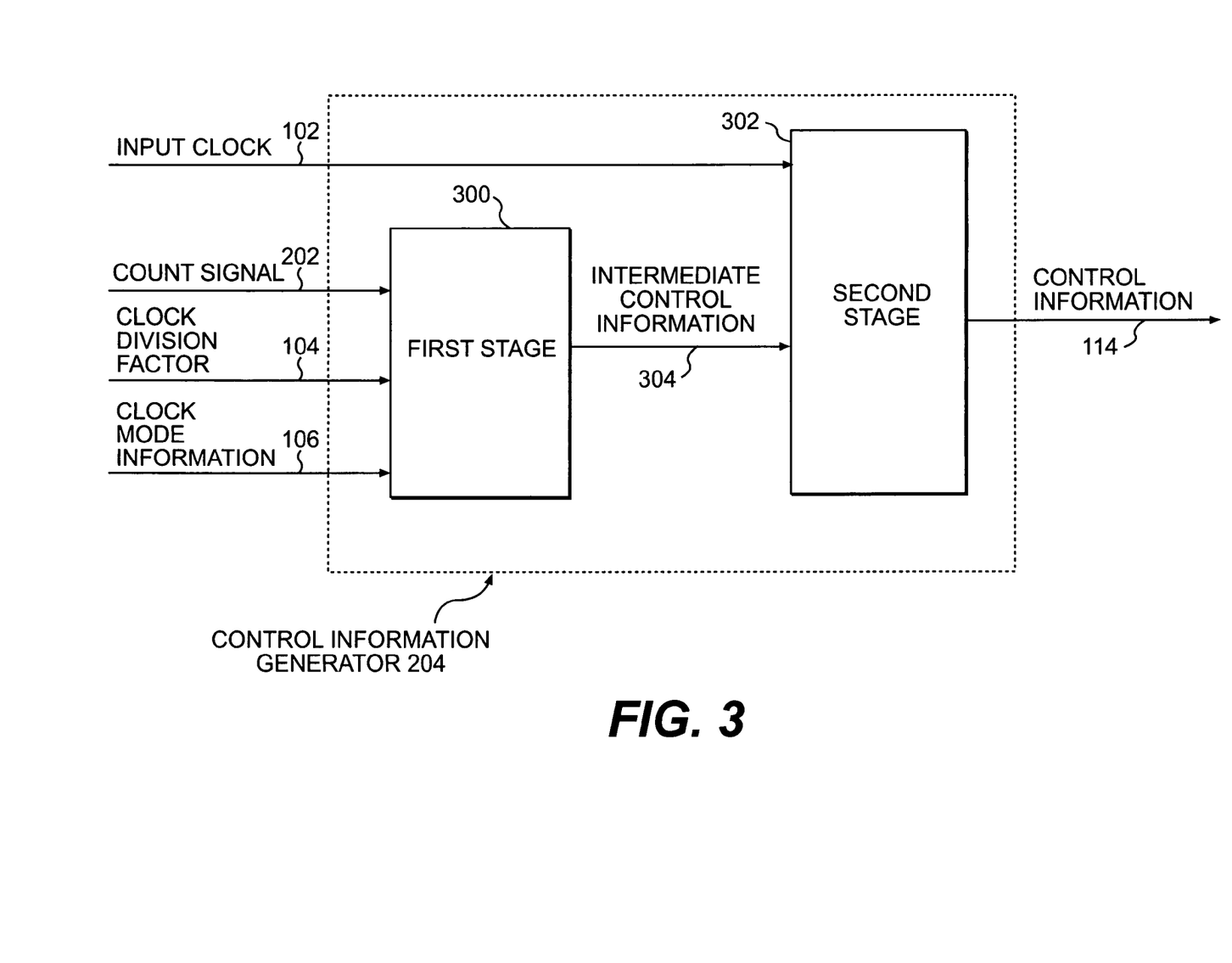
FIG. 3 is a functional block diagram of a control information generator depicted in FIG. 2.

FIG. 3 depicts control information generator 204 in FIG. 2 in greater detail. Control information generator 204 can be implemented with a first stage 300 and a second stage 302. First stage 300 can be implemented with combination logic, which may be defined by a listing of Hardware Description Language (HDL) code. Appendix A provides an exemplary listing of HDL code. First stage 300 is coupled to receive the following inputs: count signal 202 generated by counter 200 in FIG. 2, clock division factor 104, and clock mode information 106. First stage 300 outputs intermediate control information 304, which second stage 302 synchronizes with input clock 102 to generate control information 114. Second stage 302 can be implemented with flip-flops.

Figure 4:
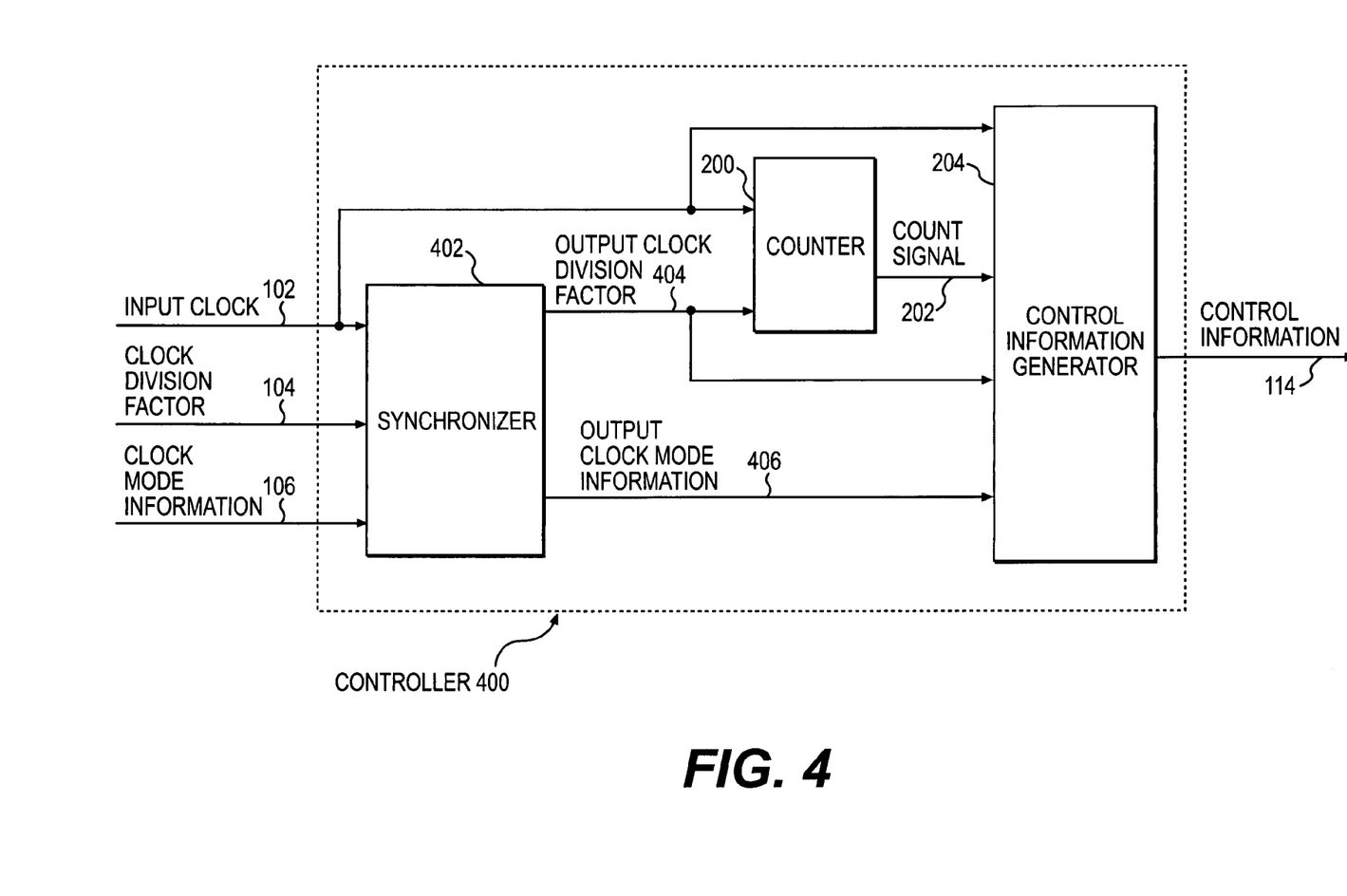
FIG. 4 is a functional block diagram of a second embodiment of the controller depicted in FIG. 1.

FIG. 4 depicts a controller 400 that is an alternative construction of controller 110 in FIGS. 1 and 2. In controller 400, clock division factor 104 and clock mode information 106 are first synchronized with input clock 102 in order to prevent potential timing problems. Synchronization may be performed where, for example, clock division factor 104 and clock mode information 106 are generated by other clock sources. To perform this synchronization, controller 400 includes a synchronizer 402 coupled to receive input clock 102, clock division factor 104, and clock mode information 106. Synchronizer 402 can be implemented with flip-flops and generates an output clock division factor 404 and output clock mode information 406, which are used by controller 400 in the same fashion as controller 110 depicted in FIGS. 1 and 2.

Figure 5:
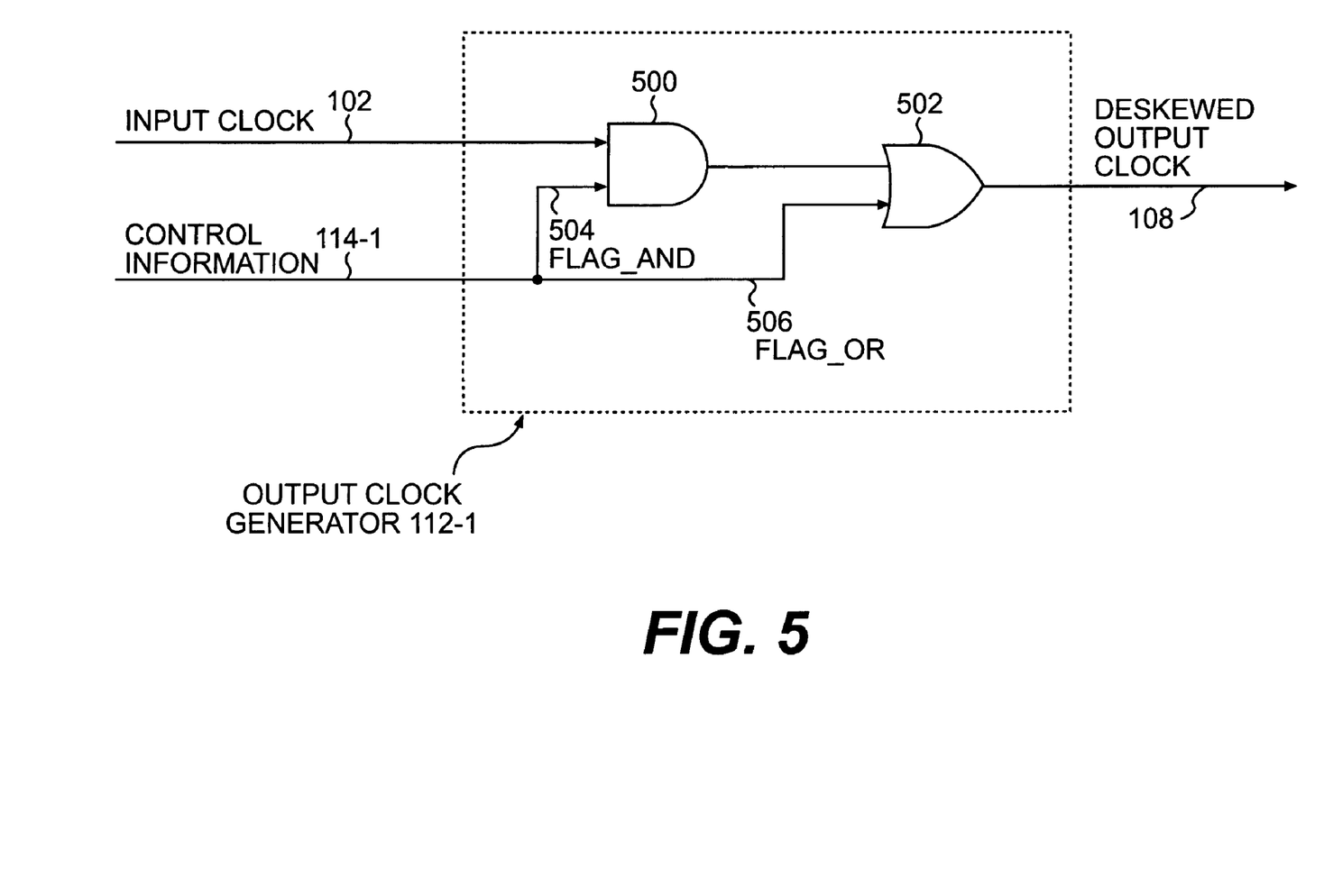
FIG. 5 is a functional block diagram of a first embodiment of an output clock generator depicted in FIG. 1.

FIG. 5 depicts an output clock generator 112-1, which is a first embodiment of the output clock generator 112 shown in FIG. 1. Output clock generator 112-1 includes an AND logic gate 500 and an OR logic gate 502. Output clock generator 112-1 is coupled to receive input clock 102 at an input of AND gate 500 and outputs deskewed output clock 108 from OR gate 502 in accordance with control information 114-1 applied by controller 110. In accordance with the first embodiment, control information 114-1 consists of a Flag_AND 504 control bit and a Flag_OR 506 control bit, applied to AND gate 500 and OR gate 502, respectively. Thus, output clock generator 112-1 generates deskewed output clock 108 according to the boolean expression: (a AND b) OR c, where "a" represents input clock 102, "b" represents Flag_AND 504, and "c" represents Flag_OR 506. The details of how Flag_AND 504 and Flag_OR 506 control bits affect deskewed output clock 108 are explained in greater detail below with reference to FIGS. 7 through 10.

Figure 6:
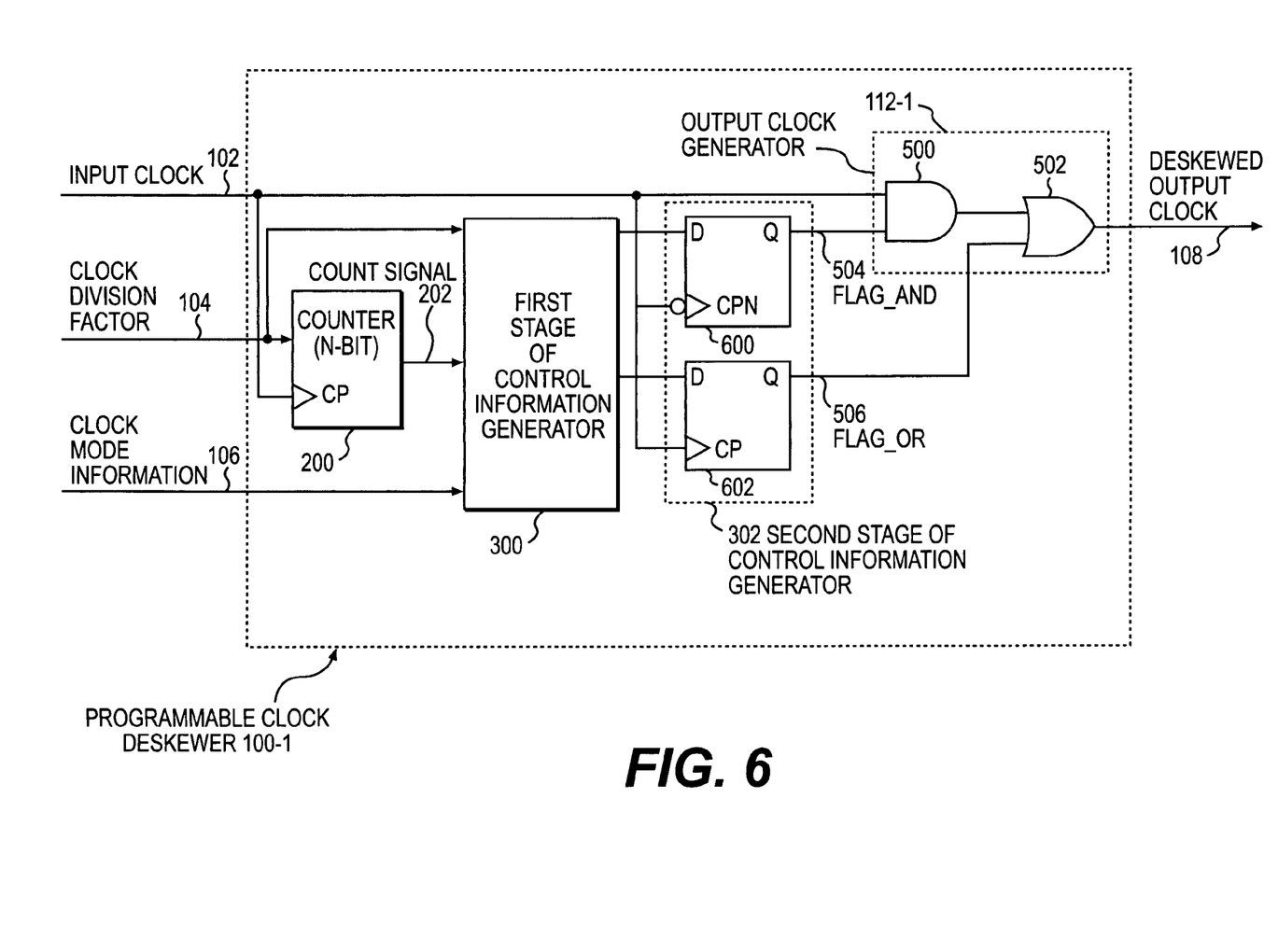
FIG. 6 is a detailed view of a first embodiment of the programmable clock deskewer consistent with the present invention.

FIG. 6 depicts a programmable clock deskewer 100-1 consistent with a first embodiment of the present invention. Programmable clock deskewer 100-1 includes counter 200 of controller 110, first stage 300 of control information generator 204, second stage 302 of control information generator 204 (consisting of flip-flops 600 and 602 for respectively generating Flag_AND 504 and Flag_OR 506), and output clock generator 112-1 (consisting of AND logic gate 500 and OR logic gate 502). Counter 200 counts from "0" to clock division factor N ($0<=N<=2^n-1$), where n is an integer. The frequency of deskewed output clock 108 of programmable clock deskewer 100-1 may range from the input clock divided by $2^n$ (the lowest clock output frequency) to divided by 1 (bypass, the highest clock output frequency). Thus, the number of output bits, "n," required for counter 200 depends on the expected frequency range, which may vary according to specific design requirements.

First stage 300 of control information generator 204, in conjunction with the flip-flops in second stage 302, generates control information 114-1 (Flag_AND 504 and Flag_OR 506) to control deskewed output clock 108. Flip-flop 600 generates Flag_AND 504 and, in the illustrated embodiment, is a falling edge triggered flip-flop. Flip-flop 602 generates Flag_OR 506 and, in the illustrated embodiment, is a rising edge triggered flip-flop.

Table 1 below shows the operation of a first hold mode, a second hold mode, and a bypass mode of programmable clock deskewer 100-1 illustrated in FIG. 6. Clock mode information 106 in the illustrated embodiment controls the mode in which programmable clock deskewer 100-1 operates. To distinguish between modes, clock mode information 106 may be two bits, referred to herein as bit-1 and bit-0 and represented in the second column of Table 1 in the format [bit-1, bit-0].

TABLE 1

Hold and Bypass Modes of the Programmable Clock Deskewer 100-1

| Mode | Clock Mode Info. 106 | Clock Division Factor (N) 104 | Flag_AND 504 | Flag_OR 506 | Deskewed Output Clock 108 | Duty Cycle Ratio Hi:Lo |
|---|---|---|---|---|---|---|
| Hold Mode (0) | bits [1, 0] | x | 0 | 0 | 0 | — |
| Hold Mode (1) | bits [1, 1] | x | 0 | 1 | 1 | — |
| Bypass | bits [0, 0] | x | 1 | 0 | Clock Input | Same as Clock Input |

The first row of Table 1 shows hold mode (0), which may be set by setting clock mode information 106 to [1, 0]. In hold mode (0), first stage 300 and second stage 302 of control information generator 204 assert the output clock to "0" by setting Flag_AND 504 to "0" and Flag_OR 506 to "0".

Hold mode (1), shown in the second row of Table 1, may be set by setting clock mode information 106 to [1, 1]. In hold mode (1), first stage 300 and second stage 302 of the control information generator 204 assert the output clock to "1" by setting Flag_AND 504 to "0" and Flag_OR 506 to "1". Hold mode (0) or hold mode (1) may be desirable during, for example, a SOCIC idle or sleep mode.

Programmable clock deskewer 100-1 may also operate in a bypass mode, which may be set by setting clock mode information 106 to [0, 0] as shown in the third row of Table 1. In bypass mode, input clock 106 is directly passed through to the deskewed output clock 108 so that deskewed output clock 108 is a delayed version of input clock 106. This is accomplished by first stage 300 and second stage 302 of control information generator 204 setting Flag_AND 504 to "1" and Flag_OR 506 to "0".

Programmable clock deskewer 100-1 may also be set to operate in a clock division mode by setting clock mode information 106 to [0,1], as shown in Table 2 below. In clock division mode, deskewed output clock 108 is a divided version of the input clock 102. The frequency of deskewed output clock 108 is designated by clock division factor (N) 104.

to "1" and Flag_OR 506 to "0." Thus, divided by "1" mode and bypass mode operate in an equivalent manner.

FIGS. 7 through 10 show exemplary timing diagrams corresponding to the operation modes listed in rows two through five of Table 2, respectively. These operation modes correspond to the programmable clock deskewer 100-1 depicted in FIG. 6.

Figure 7:
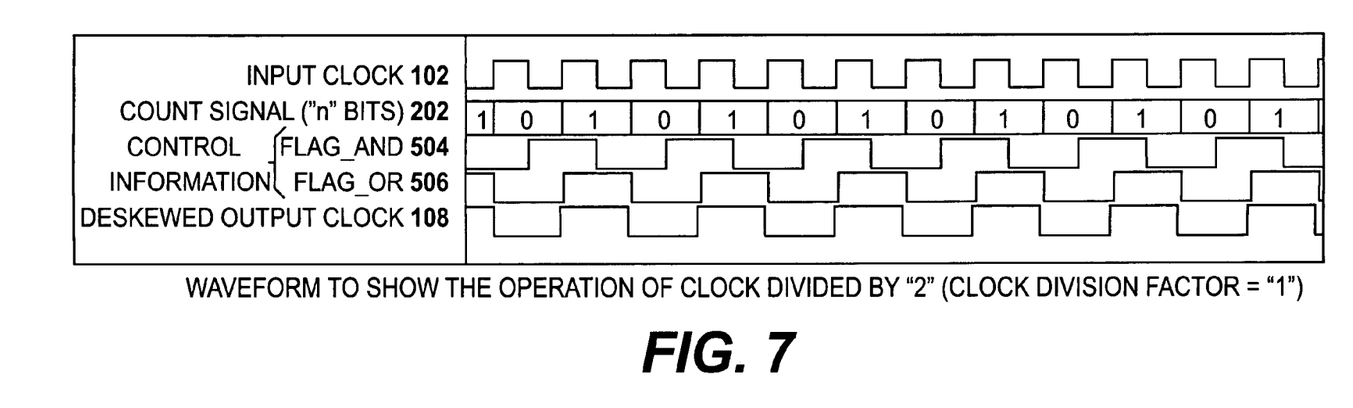
FIG. 7 is a first timing diagram to show the operation of the programmable clock deskewer.

FIG. 7 shows a timing diagram that corresponds to the operation mode of row two in Table 2. Count signal 202 is an "n" bit signal (where n is an integer) that increments to "1" and resets to "0" on rising edges of input clock 102. Referring also to FIG. 6, first stage 300 of control information generator 204 receives count signal 202 and dynamically controls the input to flip-flop 600 in second stage 302 of control information generator 204 in accordance with count signal 202. Flip-flop 600 latches this input at the falling edge of input clock 102 to generate Flag_AND 504 as shown in FIG. 7. Flip-flop 602 generates Flag_OR 506 in a similar manner but latches on the rising edge of input clock 102. Flag_AND 504 and Flag_OR 506 are applied to AND gate 500 and OR gate 502 to generate deskewed output clock 108 shown in FIG. 7.

Figure 8:
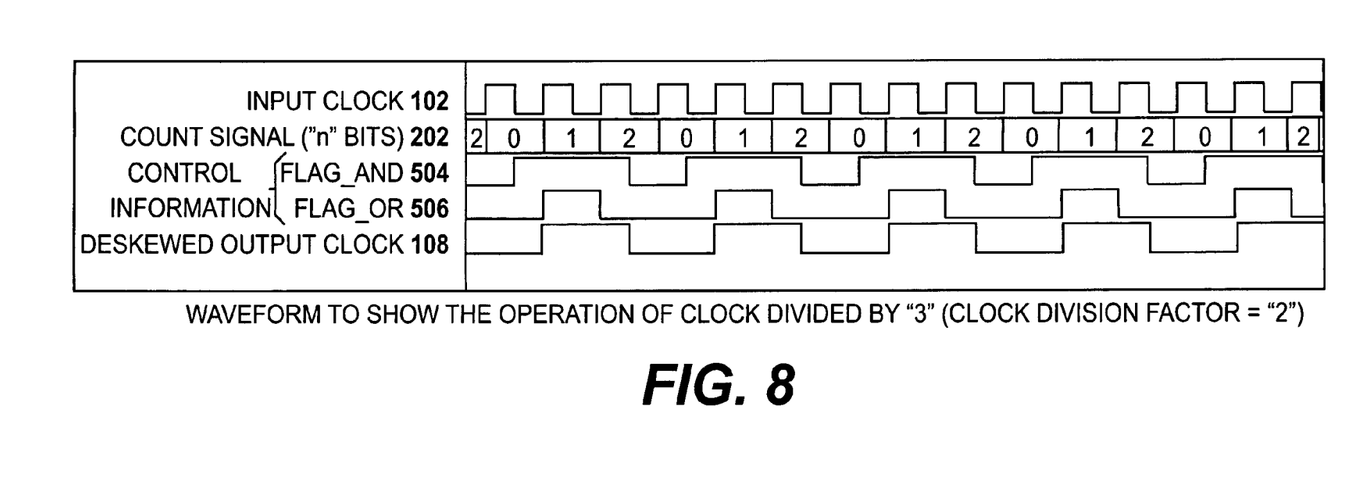
FIG. 8 is a second timing diagram to show the operation of the programmable clock deskewer.

FIG. 8 shows a timing diagram that corresponds to the operation mode of row three in Table 2, in which clock division factor 104 is set to "2" and deskewed output clock 108 is a divided by "3" version of input clock 102. Count

TABLE 2

Division Mode of the Programmable Clock Deskewer 100

| Mode | Clock Mode Info. 106 | Clock Division Factor (N) 104 | Flag_AND 504 | Flag_OR 506 | Deskewed Output Clock 108 | Duty Cycle Ratio Hi:Lo |
|---|---|---|---|---|---|---|
| Divided by "1" | bits [0, 1] | 0 | 1 | 0 | Clock Input | Same as Clock Input |
| Divided by "2" | bits [0, 1] | 1 | Dynamic | Dynamic | Clock Input/2 | 50%:50% |
| Divided by "3" | bits [0, 1] | 2 | Dynamic | Dynamic | Clock Input/3 | 50%:50% |
| Divided by "4" | bits [0, 1] | 3 | Dynamic | Dynamic | Clock Input/4 | 50%:50% |
| Divided by "5" | bits [0, 1] | 4 | Dynamic | Dynamic | Clock Input/5 | 50%:50% |
| . | . | . | . | . | . | . |
| . | . | . | . | . | . | . |
| . | . | . | . | . | . | . |
| Divided by "$2^n$" | bits [0, 1] | $2^n - 1$ | Dynamic | Dynamic | Clock Input/$2^n$ | 50%:50% |

Referring to the first row of Table 2, when clock division factor 104 is "0" (i.e., divided by "1"), deskewed output clock 108 is a divided by "1" version of the input clock 102. This is accomplished by first stage 300 and second stage 302 of control information generator 204 setting Flag_AND 504 signal 202 increments from "0" to "1," from "1" to "2," and then resets back to "0" input clock 102. As explained above in reference to FIG. 6, flip-flop 600 and flip-flop 602 are dynamically controlled in accordance with count signal 202 to generate Flag_AND 504 and Flag_OR 506. Flag_AND 504 and Flag_OR 506 are applied to the AND gate 500 and OR gate 502 to generate deskewed output clock 108 shown in FIG. 8.

Figure 9:
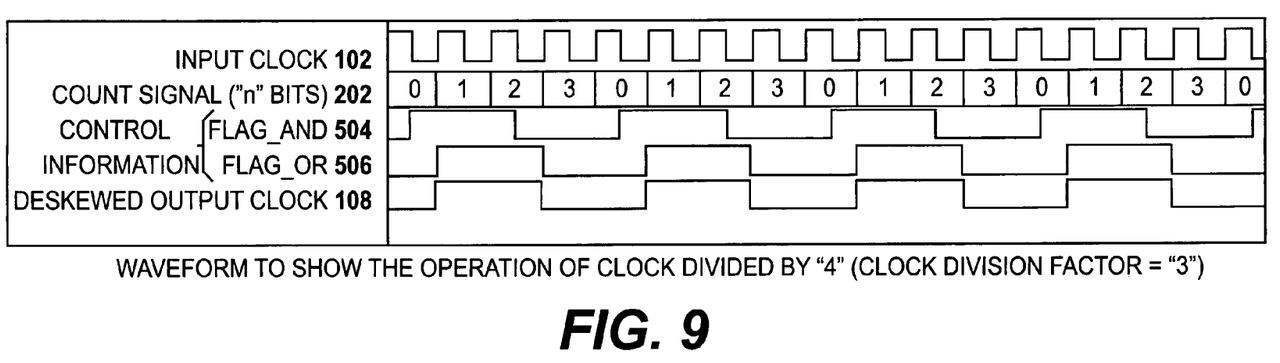
FIG. 9 is a third timing diagram to show the operation of the programmable clock deskewer.

FIG. 9 shows a timing diagram that corresponds to the operation mode of row four in Table 2, in which clock division factor 104 is set to "3" and deskewed output clock 108 is a divided by "4" version of the input clock. Count signal 202 increments from "0" to "1," from "1" to "2," from "2" to "3," and then resets back to "0" on rising edges of clock signal 102. Operation of programmable clock deskewer 100-1 proceeds as explained above in reference to FIGS. 6-8 to generate deskewed output clock 108 as shown.

Figure 10:
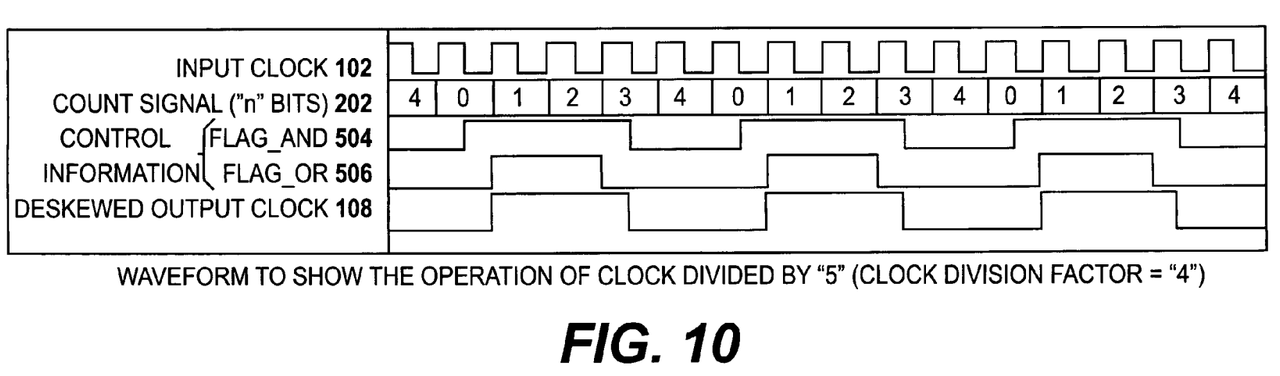
FIG. 10 is a fourth timing diagram to show the operation of the programmable clock deskewer.

FIG. 10 shows a timing diagram that corresponds to the operation mode of row five in Table 2, in which clock division factor 104 is set to "4" and deskewed output clock 108 is a divided by "5" version of the input clock. Count signal 202 increments from "0" to "1," from "1" to "2," from "2" to "3," from "3" to "4," and then resets back to "0" on rising edges of clock signal 102. Operation of programmable clock deskewer 100-1 proceeds as explained above in reference to FIGS. 6-9 to generate deskewed output clock 108 as shown.

Figure 11A:
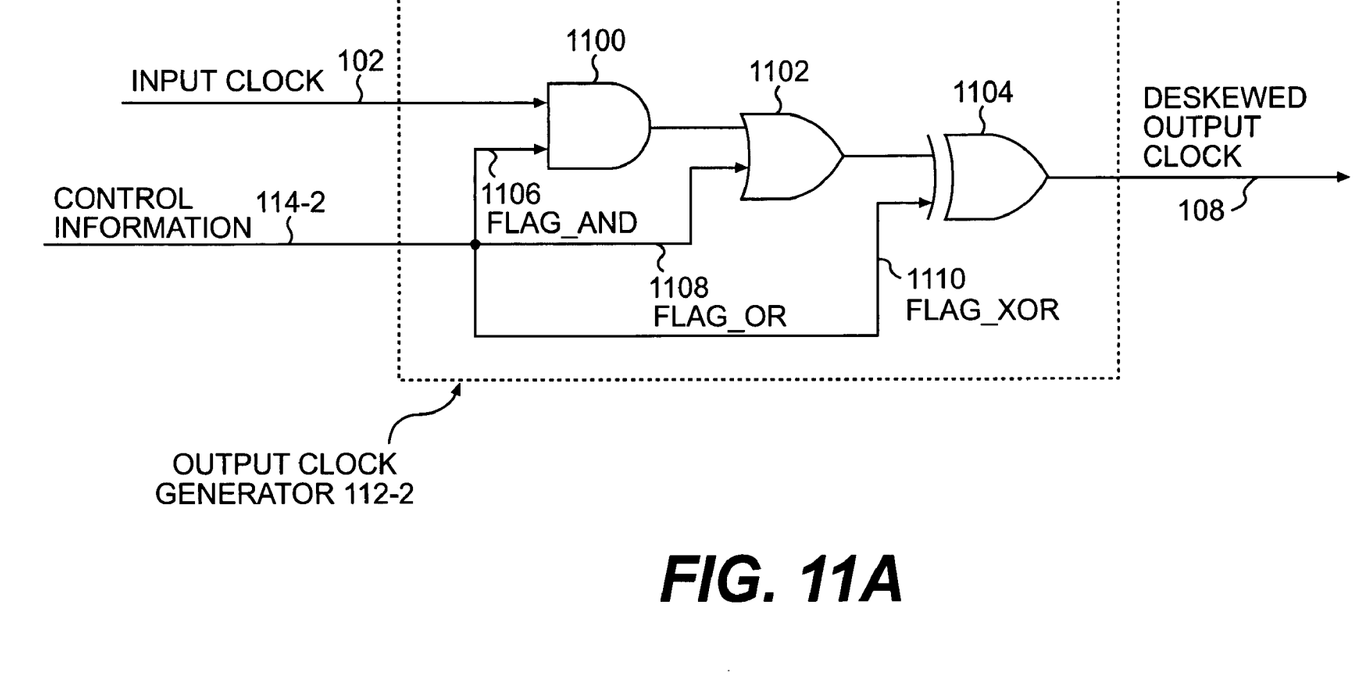
FIGS. 11A and B are functional block diagrams of a second and a third embodiment, respectively, of the output clock generator depicted in FIG. 1.

FIG. 11A depicts an output clock generator 112-2 that is a second embodiment of output clock generator 112 of FIG. 1. Output clock generator 112-2 includes an AND logic gate 1100, an OR logic gate 1102, and an XOR logic gate 1104. AND gate 1100 is coupled to receive input clock 102 at an input of AND gate 1100. Control information 114-2 includes a Flag_AND 1106 control bit, a Flag_OR 1108 control bit, and a Flag_XOR 1110 control bit applied to inputs of AND gate 1100, OR gate 1102, and XOR gate 1104, respectively. OR gate 1102 is also coupled to receive the output of AND gate 1100. XOR gate 1104 is also coupled to receive the output of OR gate 1102. As a result, output clock generator 112-2 outputs deskewed output clock 108 from XOR gate 1104 in accordance with control information 114-2 fed to it by second stage 302 of control information generator 204.

Output clock generator 112-2 is similar to output clock generator 112-1 in FIG. 5, but has the additional capability of inverting deskewed output clock 108, if desired. This is accomplished with Flag_XOR 1110 control bit in combination with XOR gate 1104. Flag_XOR 1110 bit may be set high to output an inverted version of input clock 102. Flag_XOR 1110 bit may alternatively be set low to output a non-inverted version of input clock 102. Thus, output clock generator 112-2 generates deskewed output clock 108 according to the boolean expression: ((a AND b) OR c) XOR d, where "a" represents the input clock 102, "b" represents Flag_AND 1106, "c" represents Flag_OR 1108, and "d" represents Flag_XOR 1110.

Figure 11B:
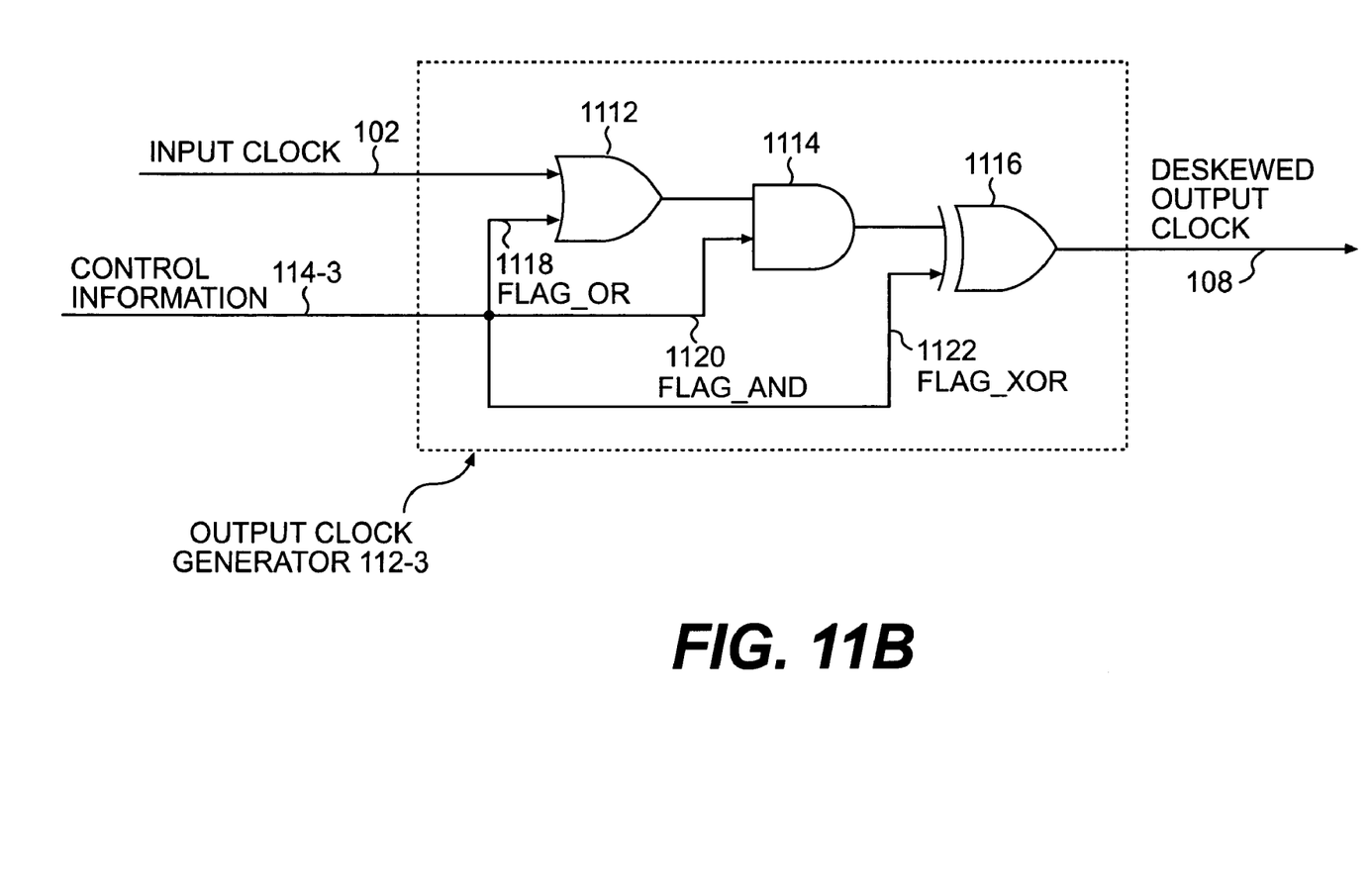

FIG. 11B depicts an output clock generator 112-3 that is a third embodiment of the output clock generator 112 of FIG. 1. In this embodiment, control information 114-3 of output clock generator 112-3 and combination logic in first stage 300, from which control information 114-3 originates, may differ from that of output clock generator 112-2. Output clock generator 112-3 includes an OR logic gate 1112, an AND logic gate 1114, and an XOR logic gate 1116. Control information 114-3 includes a FLAG_OR 1118 control bit, a FLAG_AND 1120 control bit, and a FLAG_XOR 1122. FLAG_OR 1118, FLAG_AND 1120, and FLAG_XOR 1122 are applied to inputs of OR gate 1112, AND gate 1114, and XOR gate 1116, respectively. OR gate 1112 is also coupled to receive input clock 102 at one of the OR gate 1112 inputs. AND gate 1114 is also coupled to receive the output of OR gate 1112. XOR gate 1116 is also coupled to receive the output of AND gate 1114. As a result, output clock generator 112-3 outputs deskewed output clock 108 from XOR gate 1116 in accordance with the control information 114-3 fed to it by second stage 302 of control information generator 204.

Like the output clock generator 112-2, output clock generator 112-3 has the capability of inverting deskewed output clock 108, if desired, by setting Flag_XOR 1122 control bit high or low. Output clock generator 112-3 generates deskewed output clock 108 according to the boolean expression: ((a OR b) AND c) XOR d, where "a" represents the input clock 102, "b" represents FLAG_OR 1118, "c" represents FLAG_AND 1120, and "d" represents FLAG_XOR 1122.

Figure 12:
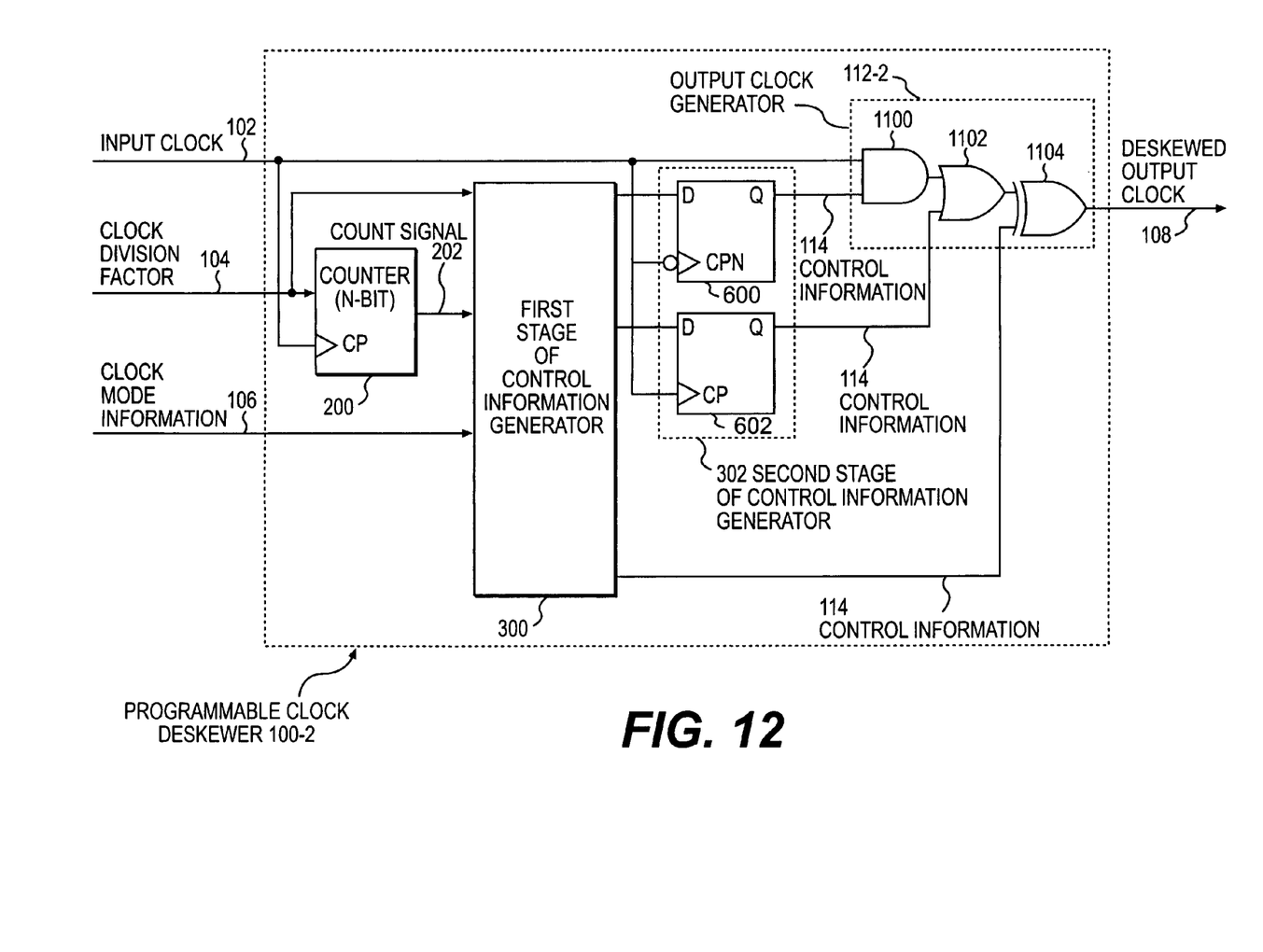
FIG. 12 is a detailed view of a second embodiment of the programmable clock deskewer consistent with the present invention.

FIG. 12 depicts a programmable clock deskewer 100-2 consistent with a second embodiment of the present invention. Programmable clock deskewer 100-2 includes output clock generator 112-2 of FIG. 11A. As explained with reference to FIG. 11A, XOR gate 1104 enables programmable clock deskewer 100-2 to invert deskewed output clock 108, if desired. Otherwise, operation of programmable clock deskewer 100-2 is similar to that of programmable clock deskewer 100-1, as explained above with reference to FIGS. 7 through 10.

Figure 13:
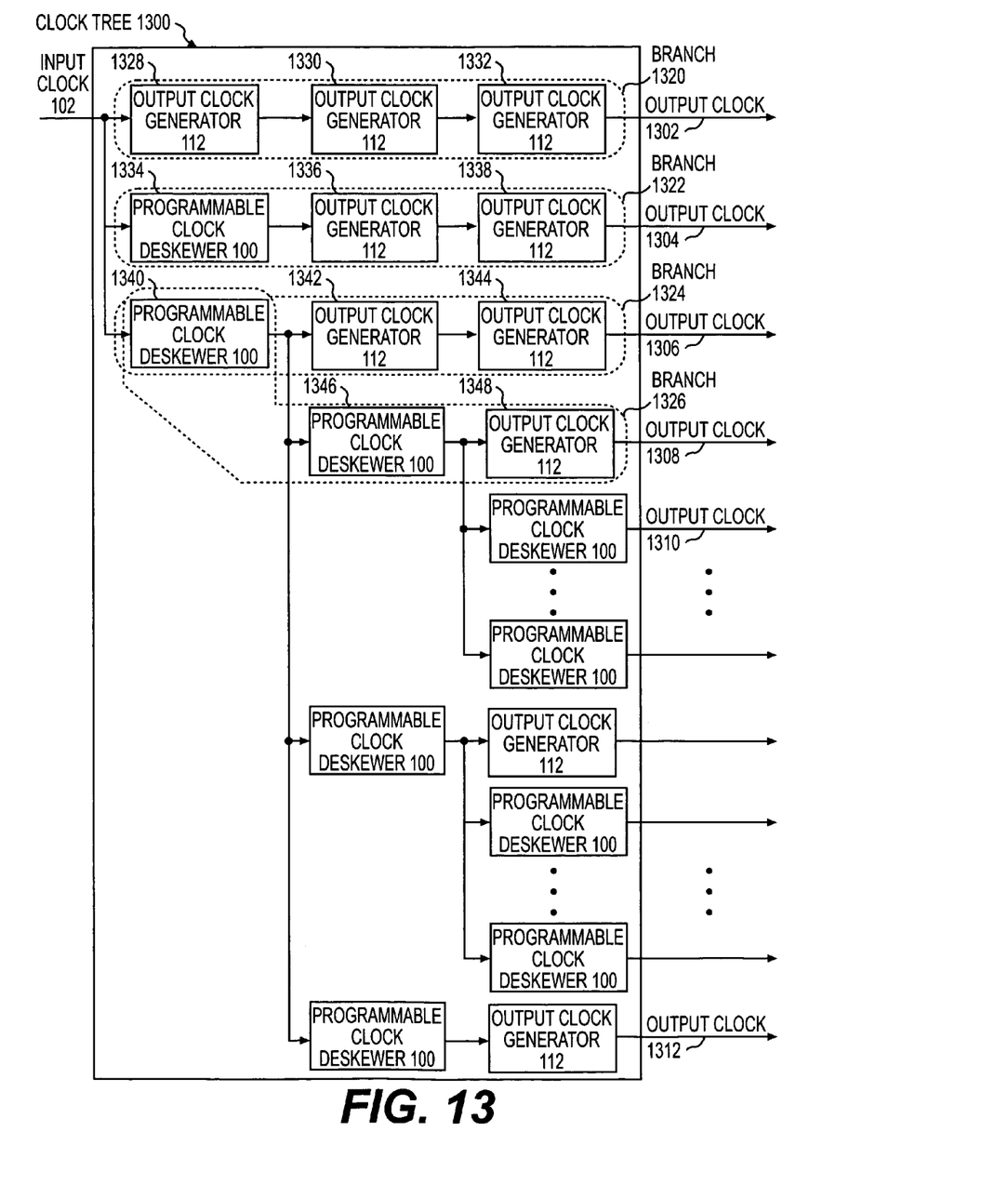
FIG. 13 is a functional block diagram of a clock tree including programmable clock deskewers and output clock generators consistent with the present invention.

A consistent delay for bypass mode and divided mode is desirable in the design of a clock tree for a SOCIC. FIG. 13 depicts a clock tree 1300 that generates multiple output clocks 1302-1312, each output clock having a programmable frequency according to the requirements of the various functional blocks of the SOCIC. Output clocks 1302-1312 are generated by various branches of clock tree 1300. Branches 1320-1326 are exemplary branches of clock tree 1300. Branch 1320, for example, consists of output clock generators 1328-1332 coupled in series to generate output clock 1302. Branch 1322 consists of programmable clock deskewer 1334 and output clock generators 1336 and 1338 coupled in series to generate output clock 1304. Branch 1324 consists of programmable clock deskewer 1340 and output clock generators 1342 and 1344 coupled in series to generate output clock 1306. Branch 1326 consists of programmable clock deskewers 1340 and 1346 and output clock generator 1348 coupled in series to generate output clock 1308. Clock tree 1300 may also consist of various other branches for generating additional output clocks, such as output clocks 1310 and 1312, as shown. Branches may share certain programmable clock deskewers in common. For example, branch 1324 shares programmable clock deskewer 1340 in common with branch 1326. In addition, the branch that generates output clock 1310 shares programmable clock deskewer 1340 and programmable clock deskewer 1346 in common with branch 1326. Thus, each output clock of clock tree 1300 is generated by a unique branch composed of a combination of programmable clock deskewers 100 and output clock generators 112. Furthermore, each of the programmable clock deskewers 100 includes within it an output clock generator 112 (not shown), as depicted in FIG. 1. In this manner, all branches contain the same number of output clock generators 112 and the delay caused by each branch is the same. Because the delay caused by each branch is the same, this configuration minimizes the clock skew among the various output clocks 1302-1312 to approximately zero.

The number of output clock generators 112 in each branch of clock tree 1300 may be modified according to the SOCIC requirements, but should be consistent among the branches in order to maintain a consistent delay. The programmable clock deskewers in clock tree 1300 may also receive as input a clock division factor and clock mode information (not shown). The clock division factors and clock mode information bits may vary according to specific SOCIC requirements.

Other embodiments of the invention will now be apparent to those skilled in the art from consideration of the specification and practice of the invention disclosed herein. For example, synchronizer 402, counter 200, and second stage 302, as shown in FIGS. 4, 6, and 12, may each be configured to receive an externally provided reset signal (not shown) for resetting the programmable clock deskewer 100. It is intended that the specification and examples be considered as exemplary only, with a true scope and spirit of the invention being indicated by the following claims.

APPENDIX A

Sample HDL Code

```
'define div_set2lo 2'b10
'define div_set2hi 2'b11
'define div_normal 2'b01
'define div_bypass 2'b00
//--- Pogrammable Clock Deskewer ---
module PCD(RSTn, CLK, CDF, CMI, CLKO);
    parameter div_bits = 4;      //Define the Bit of Counter
    input RSTn;                  //Reset Input, Low Active
    input CLK;                   //Input Clock
    input [(div_bits − 1 ):0] CDF; //Clock Division Factor (CDF)
    input [1:0] CMI;             //Clock Mode Information (CMI)
    output CLKO;                 //Output Clock
//--- Counter ---
    reg [(div_bits − 1):0] CNT;
    always @ (posedge CLK or negedge RSTn)
      begin
        if (RSTn == 0) CNT <= 0;
          else if ((CMI == 'div_set2lo) |(CMI ==
             'div_set2hi)) CNT <= 0;
            else if (CNT >= CDF) CNT <= 0;
              else CNT <=CNT + 1;
      end
//--- Generate Control Signals to Control Output Clock ---
    reg X_FLAG_AND;
    always @ (CMI or CDF or CNT)
      begin
        if (CMI == 'div_bypass) X_FLAG_AND <= 1'b1;
          else if (CMI == 'div_set2hi) X_FLAG_AND <= 1'b1;
            else if (CMI == 'div_set2lo) X_FLAG_AND <= 1'b0;
              else if (CDF == 0) X_FLAG_AND <= 1'b1;
                else if (CNT == 0) X_FLAG_AND <= 1'b1;
                  else if (CNT > {1'b0, CDF[(div_bits − 1):1]})
                     X_FLAG_AND <= 1'b0;
                    else X_FLAG_AND <= 1'b1;
      end
    reg X_FLAG_OR;
    always @ (CMI or CDF or CNT)
      begin
      if (CMI == 'div_set2hi) X_FLAG_OR <= 1'b1;
        else if ((CMI == 'div_set2lo) | (CMI ==
           'div_bypass) | (CDF == 0)) X_FLAG_OR
<= 1'b0;
          else if (CNT == 0) X_FLAG_OR <= 1'b1;
            else if ((CDF[0] == 1'b1) & (CNT > {1'b0,
               CDF[(div_bits − 1):1]}))
X_FLAG_OR <= 1'b0;
              else if ((CDF[0] == 1'b0) & (CNT > ({1'b0,
                 CDF[(div_bits − 1):1]}− 1'b1)))
X_FLAG_OR <= 1'b0;
                else X_FLAG_OR <= 1'b1;
      end
//--- "FLAG_AND" Signal (Falling Clock Edge) ---
    reg FLAG_AND;
    always @ (negedge CLK or negedge RSTn)
      begin
        if (RSTn == 0) FLAG_AND <= 1'b1;
          else FLAG_AND <= X_FLAG_AND;
      end
//--- "FLAG_OR" Signal (Rising Clock Edge) ---
    reg FLAG_OR;
```

APPENDIX A-continued

Sample HDL Code

```
    always @ (posedge CLK or negedge RSTn)
      begin
        if (RSTn == 0) FLAG_OR <= 1'b0;
          else FLAG_OR <= X_FLA_OR;
      end
//--- Output Clock Generator Stage ---
    OCG IOCG(.CLK(CLK), .FLAG_AND(FLAG_AND),
       .FLAG_OR(FLAG_OR), .CLKO(CLKO));
endmodule
//--- Output Clock Generator ---
module OCG(CLK, FLAG_AND, FLAG_OR, CLKO);
    input CLK, FLAG_AND, FLAG_OR;
    output CLKO;
    wire CLKO;
    assign CLKO = (CLK & FLAG_AND) | FLAG_OR;
endmodule
```

What is claimed is:

1. A programmable clock generator comprising:
   a first input for receiving an input clock; and
   an output clock generator, responsive to the input clock and first control information, to generate a de-skewed output clock, the output clock generator comprising a single series logic path that couples the input clock to the de-skewed output clock.

2. The programmable clock generator of claim 1, wherein the first control information comprises two bits.

3. The programmable clock generator of claim 1, wherein the first control information comprises three bits.

4. The programmable clock generator of claim 2, wherein the output clock generator comprises logic having a boolean expression of (a AND b) OR c, "a" representing the input clock, and "b" and "c" representing the two bits of the first control information.

5. The programmable clock generator of claim 3, wherein the output clock generator comprises logic having a boolean expression of ((a AND b) OR c) XOR d, "a" representing the input clock, and "b," "c," and "d" representing the three bits of the first control information.

6. The programmable clock generator of claim 3, wherein the output clock generator comprises logic having a boolean expression of ((a OR b) AND c) XOR d, "a" representing the input clock, and "b," "c," and "d" representing the three bits of the first control information.

7. The programmable clock generator of claim 1, further comprising:
   a second input for receiving a first clock division factor;
   a third input for receiving first clock mode information; and
   a controller, responsive to the input clock, to generate the first control information for controlling a frequency of the de-skewed output clock.

8. The programmable clock generator of claim 7, wherein the controller further comprises:
   a counter, responsive to the input clock and the first clock division factor, to generate a count signal; and a control information generator, responsive to the input clock, the count signal, the first clock division factor, and the first clock mode information, to generate the first control information.

9. The programmable clock generator of claim 7, wherein the controller further comprises:
a synchronizer, responsive to the input clock, the first clock division factor, and the first clock mode information, to generate a second clock division factor and second clock mode information that are synchronized with the input clock;
a counter, responsive to the input clock and the second clock division factor, to generate a count signal; and
a control information generator, responsive to the input clock, the count signal, the second clock division factor, and the second clock mode information, to generate the first control information.

10. The programmable clock generator of claim 8, wherein the control information generator comprises:
a first stage, responsive to the count signal, the first clock division factor, and the first clock mode information, to generate second control information; and
a second stage, responsive to the second control information and the input clock, to generate the first control information synchronized with the input clock.

11. The programmable clock generator of claim 10, wherein the second stage comprises flip-flops.

12. The programmable clock generator of claim 9, wherein the control information generator comprises:
a first stage, responsive to the count signal, the second clock division factor, and the second clock mode information, to generate second control information; and
a second stage, responsive to the second control information and the input clock, to generate the first control information synchronized with the input clock.

13. The programmable clock generator of claim 12, wherein the second stage comprises flip-flops.

14. A programmable clock generator of claim 1, wherein the output clock generator selectably generates the de-skewed output clock in an inverted mode or a non-inverted mode with respect to the input clock according to the first control information, and the output clock generator introduces a delay that is independent of the modes.

15. A clock tree comprising:
a first input for receiving an input clock; and
branches, responsive to the input clock, to generate de-skewed output clocks, each branch comprising a single series logic path that couples the input clock to a de-skewed output clock, each branch comprising an equal number of clock generators coupled in series.

16. The clock tree of claim 15, wherein the equal number of clock generators coupled in series is at most three.

17. The clock tree of claim 15, wherein the clock tree comprises controllers for controlling the frequencies of the de-skewed output clocks.

* * * * *